United States Patent
Kaelin et al.

(10) Patent No.: US 6,441,516 B1
(45) Date of Patent: Aug. 27, 2002

(54) SHOCKPROOF DEVICE FOR A POWER GENERATOR WITH AN OSCILLATING WEIGHT

(75) Inventors: Laurent Kaelin, Sonvilier; Jean-Philippe Rebeaud, Cressier, both of (CH)

(73) Assignee: Eta Sa Fabriques D'ebauches, Grenchen (CH)

( * ) Notice: Subject to any disclaimer, the term of this patent is extended or adjusted under 35 U.S.C. 154(b) by 0 days.

(21) Appl. No.: 09/661,550

(22) Filed: Sep. 14, 2000

(30) Foreign Application Priority Data

Sep. 17, 1999 (EP) ............................. 99118465

(51) Int. Cl.⁷ .................... G04B 5/08; G04C 10/00; F16F 1/10
(52) U.S. Cl. .................. 310/36; 310/75 R; 185/45; 368/144; 368/208
(58) Field of Search ................... 185/40 R, 40 B, 185/45; 267/199; 310/52, 36, 37; 368/208, 144; 322/3; 318/119, 131

(56) References Cited

U.S. PATENT DOCUMENTS

| | | | | |
|---|---|---|---|---|
| 1,276,456 A | * | 8/1918 | Vasselli | 185/45 |
| 2,399,131 A | * | 4/1946 | Matter | 368/208 |
| 2,721,627 A | * | 10/1955 | Wittel | 185/45 |
| 3,733,806 A | * | 5/1973 | Murle | 368/208 |
| 5,532,982 A | * | 7/1996 | Beguin et al. | 368/204 |
| 5,923,619 A | * | 7/1999 | Knapen et al. | 368/64 |
| 6,023,446 A | * | 2/2000 | Farine et al. | 368/204 |
| 6,041,021 A | * | 3/2000 | Shinkawa et al. | 368/64 |

FOREIGN PATENT DOCUMENTS

| | | |
|---|---|---|
| EP | 791 867 | 8/1997 |
| EP | 918 265 | 5/1999 |

* cited by examiner

Primary Examiner—Burton S. Mullins
(74) Attorney, Agent, or Firm—Sughrue Mion, PLLC

(57) ABSTRACT

The device includes a barrel (2) inserted in the kinematic chain between the rotor (11) of the generator (1) and the oscillating weight (3). The barrel includes a spiral coiled spring (4) and a sliding strip (6), wound in the same direction as the spiral coiled spring over the length of a turn, without any mechanical connection with the spring, but forming a protective envelope in the open position in case of shock. The shockproof device can be applied to the generator of a wristwatch.

7 Claims, 3 Drawing Sheets

SHOCKPROOF DEVICE FOR A POWER GENERATOR WITH AN OSCILLATING WEIGHT

BACKGROUND OF THE INVENTION

The present invention relates to a shockproof device for a power generator with an oscillating weight, intended to protect the moving elements of the device against any damage, in particular in the event of shocks able to cause excessive oscillation of said oscillating weight liable to cause irreversible damage to the elements and wheels an pinions in the kinematic chain meshed with a mechanical energy accumulator such as a barrel, or with the rotor of an electric generator.

The invention concerns, in particular, a device of this type for a power generator of small dimensions with an oscillating weight, whose moving elements are naturally more fragile, said generator being used to activate an instrument of small volume carried by a user whose movements will cause the oscillating weight to oscillate. It concerns, for example, in a non-limiting way, a wristwatch whose electronic movement and/or electronic circuit for transmitting and/or receiving electromagnetic signals, is powered directly or indirectly by the current generated by an electric microgenerator driven by the oscillating weight.

It has long been sought to resolve the problems of mechanical resistance posed by power generators with an oscillating weight in the event of misuse, shock, or accidental dropping of the apparatus, and a certain number of solutions have already been proposed.

For mechanical self winding watches, Swiss Patent No. 281 490, published in 1952, discloses a timepiece including an oscillating winding weight supported by a thin elastic zigzagged arm, intended to dampen any axial shocks borne by the weight. This arm is secured to a pinion meshing with a toothed sector which co-operates with the barrel ratchet wheel, the assembly being completed by two shock absorber springs which limit the amplitude of the oscillations of the weight.

According to an earlier document, Swiss Patent No. 254 577 published in 1948, shock absorption or dampening of the oscillating weight is obtained by means of a spiral spring with a vertical strip mounted between the oscillating weight and a part secured with the pivots. According to one embodiment, this spiral spring surrounds the pivoting arbour of the oscillating weight and according to another embodiment one or more of these springs are arranged above the oscillating weight, while being off-centre with respect to said pivoting arbour to form an elastic connection between a bell secured to the pivoting arbour and the oscillating weight itself. In this construction it will be noted that the ends are securely anchored to their respective points of attachment by means of pins and that overshooting the dampening limits could cause deformation of the spring without however removing it from its anchoring points.

In a more recent document, European Patent No. 0 791 867, a device is proposed wherein, according to one embodiment, dampening is obtained by means of an intermediate wheel and pinion formed by a toothed wheel supporting a flat spiral coiled spring having at most three turns, whose ends are securely anchored on the one hand, in said wheel, meshed with the pinion of the generator rotor, and on the other hand in an arbour able to freely rotate in said wheel, said arbour including a pinion meshed with the teeth of a ring supporting the oscillating weight. In normal operation, the spiral coiled strip has sufficient rigidity that it undergoes practically no deformation. When the oscillating weight is driven more than normally, for example during an abrupt movement for a watch worn on the wrist, the flat spiral coiled spring can certainly be deformed sufficiently to avoid damaging the gear trains.

For more significant stress on the oscillating weight, for example when the instrument of small volume is dropped, the flat spiral spring mountings will probably resist. However, there is certainly a risk that the flat spiral spring will buckle creating irreversible deformation, which is detrimental to the operation of the instrument.

SUMMARY OF THE INVENTION.

In order to overcome the inadequacies or drawbacks which still exist in the most pertinent devices of the aforecited prior art to avoid damage created by the oscillating weight operating in extreme conditions, the present invention concerns a shockproof device in which the arrangement of a spiral coiled spring wound in a micro-barrel both prevents an anchoring point of the spring being torn off or the irreversible deformation thereof when the oscillating weight is made to move in extreme conditions, and provides a small reserve of inertia favourable to the global efficiency of the device in such conditions.

The invention thus concerns a shockproof device for a generator activated by the alternating movements of an oscillating weight transmitted to the generator via a barrel, said generator including a rotor provided with a pinion, said oscillating weight including an unbalanced mass secured to an axle and supported by a toothed ring, and said barrel including a drum, having a base extended radially by a ring to form a toothed wheel, which rotates freely about a pivoted arbour and inside which is wound a spiral coiled spring coupled by one end to the oscillating weight axle and secured by the other end to the inner wall of the drum to form driving means for the rotor, said spiral coiled spring having an elastic constant, such that during normal operation, the turns are wound or unwound from a neutral position in which they are regularly spaced and occupy, in the event of a shock, an open position in which the turns are pressed against the inside of the drum or a closed position in which the turns are regrouped at the centre, characterised in that a sliding strip is also coupled to the arbour driven by the oscillating weight wound in the same manner as the spiral coiled spring to surround the latter without any rigid mechanical connection over a length substantially corresponding to a turn in an open position.

The shockproof device according to the invention may be formed of a single mechanical entity including both the barrel and the oscillating weight. In this embodiment, the unbalanced mass of the oscillating weight is mounted so as to rotate freely with respect to the toothed ring. The barrel and the oscillating weight have the same axis of revolution, so that the barrel arbour and the oscillating weight axle form a single part. Likewise, the toothed wheel of the barrel and the toothed wheel of the oscillating weight form a single part to form a single toothing which meshes directly with the rotor pinion.

According to another preferred embodiment of the invention, the shockproof device according to the invention is made in the form of an intermediate wheel and pinion inserted between the generator and the oscillating weight. This intermediate wheel and pinion includes a barrel, as defined previously, whose toothed wheel meshes with the rotor pinion and whose arbour is extended by a pinion which meshes with the toothed ring of the oscillating weight whose unbalanced mass is secured to said ring, for example by being made integral therewith, by being welded or forced thereon. This embodiment, which will be taken as an illustrative example hereinafter, has the advantage, compared to the preceding embodiment, of reducing the global height of the device and increasing the rotor speed as a result of a step up gear.

This device wherein alternating mechanical energy is transformed into a direct current, obviously includes in a known manner a mechanical inversion system such as a click wheel, allowing the rotor always to be driven in the same direction, or an electronic polarity inverting circuit.

BRIEF DESCRIPTION OF THE DRAWINGS.

The invention will be better understood by the following description of an embodiment with reference to the annexed drawings, in which.

DETAILED DESCRIPTION OF THE INVENTION

For a better understanding of the invention, the embodiment illustrated by FIGS. 1 to 5 is that in which the shockproof device is formed by an intermediate wheel and pinion and includes an electronic polarity inverting circuit which is not shown.

Figure 1:
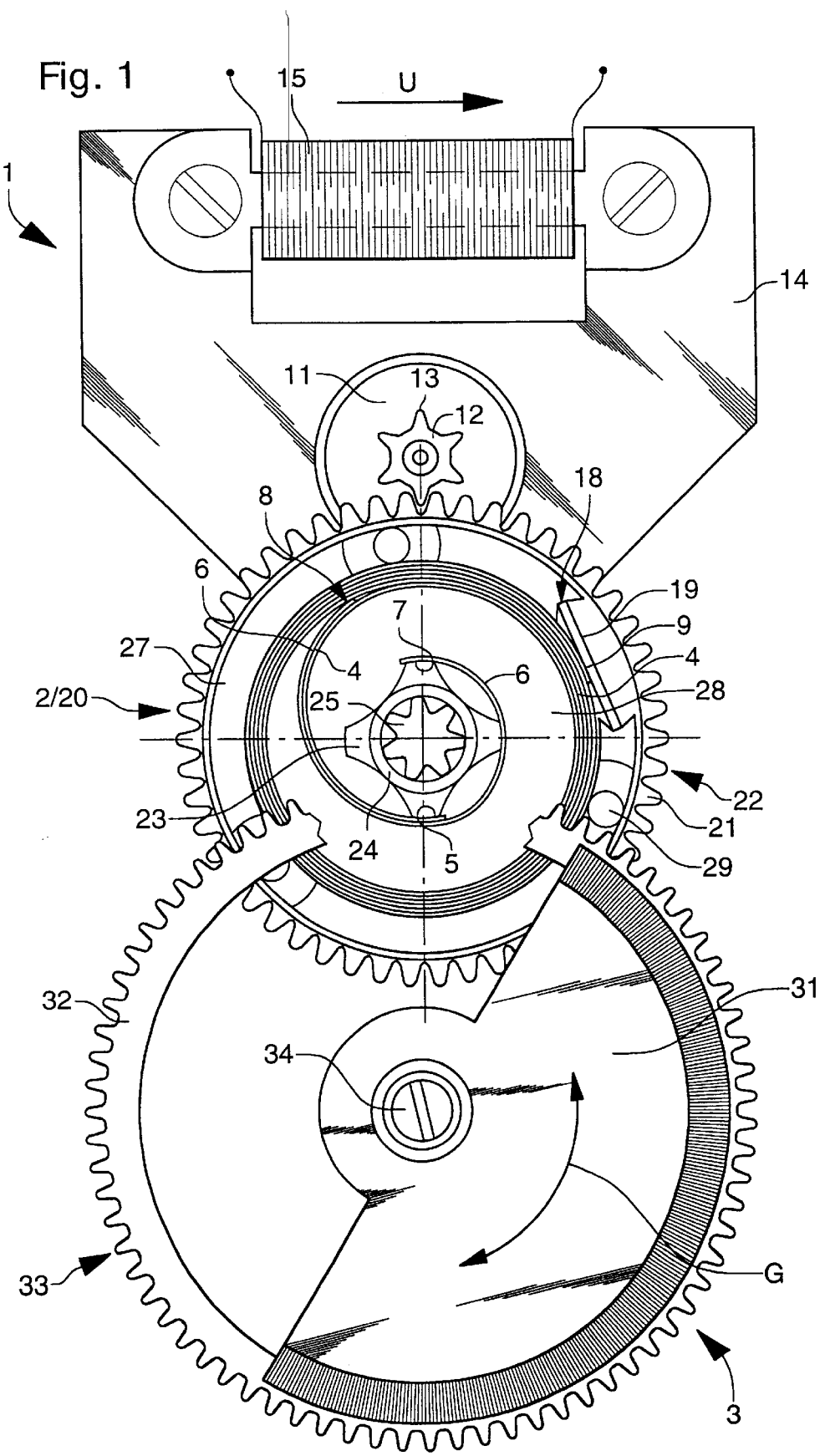
FIG. 1 is a top view of a generator incorporating the shockproof device according to the invention when the oscillating weight occupies an extreme position.

FIG. 1 shows schematically a generator 1 whose power source is formed by an oscillating weight 3 activated by gravity, the corresponding oscillating movement being illustrated by double arrow G. The device is fitted to an instrument of small volume which may be, for example, a wristwatch. Oscillating weight 3 is made to move by the movements of the arm which carries the watch to give it a back-and-forth movement which, in mechanical watches winds the barrel of the watch, i.e. winds a spiral coiled spring intended subsequently to give back to the clockwork movement the mechanical energy thereby accumulated. As described, for example, in French Patent No. 1 186 795, the barrel may be fitted with a safety device formed by a flange secured to the end of the outer turn of the spring to jump from one blocking support to another in the event of excessive winding, in order to avoid breaking the anchorage point at the centre.

In the present case the accumulation of mechanical energy does not constitute the essential object of the invention for which the end of the outer turn has to have a fixed anchoring point on the inner wall of the drum. As is seen with reference to FIGS. 1 and 2, oscillating weight 3 indirectly activates a generator 1 supplying a very high capacity accumulator or capacitor (not shown) with electric voltage U. The energy stored in this accumulator or capacitor in turn powers the electronic circuits (quartz, divider, etc.) necessary for the watch to operate.

Generator 1 includes a rotor 11 coupled to the mechanical system by the teeth 13 of a pinion 12, a bipolar stator 14 and a winding 15 surrounding stator 14, across the terminals of which voltage U generated by generator 1 is picked up. According to the embodiment shown an intermediate wheel and pinion 20 is inserted in the kinematic chain between rotor 11 of generator 1 and oscillating weight 3.

Figure 2:
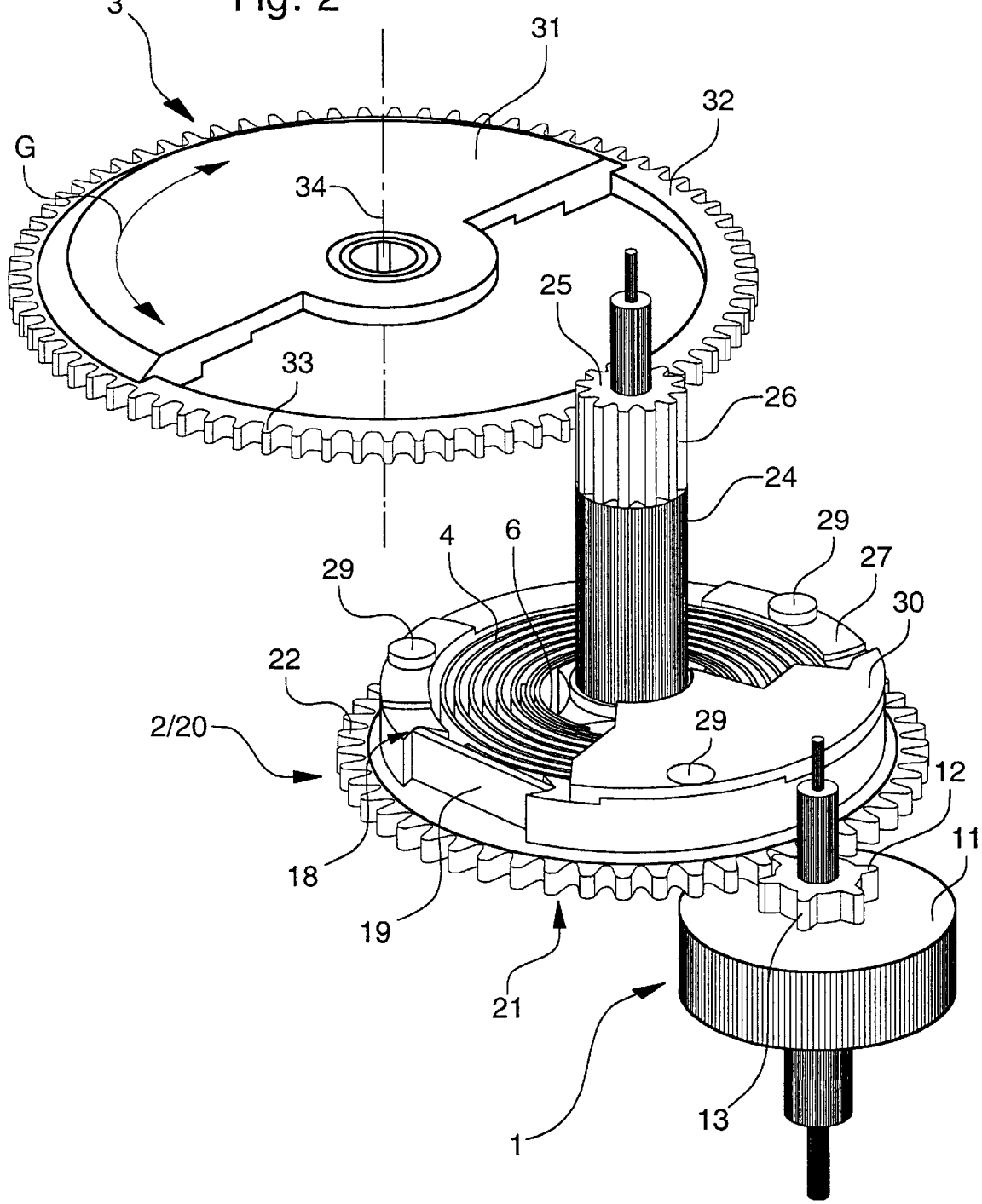
FIG. 2 is a perspective view corresponding to FIG. 1, but limited to the kinematic chain when the oscillating weight is in the neutral position.

The oscillating weight, shown in FIG. 1 in an extreme position and in FIG. 2 in a balanced position, includes in a known manner an unbalanced mass 31 having substantially the shape of a half-circle pivoted at its centre on an axle 34 and secured to a toothed ring 32 which may be made integral with unbalanced mass 31 or form a separate part, for example welded or mounted by force. One portion of this toothed ring 32 has not been shown so as to make the shockproof device according to the invention, which is housed in intermediate wheel and pinion 20, appear more clearly.

Intermediate wheel and pinion 20 includes a barrel 2 formed by a drum 27 closed on one side by a base 28 which extends radially beyond drum 27 to form a toothed wheel 21 whose teeth 22 mesh with teeth 13 of rotor pinion 12. This intermediate wheel and pinion 20 is subsequently closed by a cover 30 shown partially form away in FIG. 2 to show the core of the shockproof device. This cover 30 is positioned and fixed by means of pins 29 secured to drum 27. The drum includes at its centre an arbour 24 on which a collet 23 with four arms is blocked. This arbour 24 has at one of its ends, on the side of collet 23, mounted so as to rotate freely in base 28 and its other end is extended by a pinion 25 whose teeth 26 mesh with teeth 33 of toothed ring 32 of the oscillating weight. As is seen more clearly in FIG. 2, there is then no kinematic connection between generator 1 and oscillating weight 3. In order to establish this kinematic connection and to guarantee that it holds well in the event of a shock, the barrel includes a spiral coiled spring 4 and a sliding strip 6 the arrangement of which is explained hereinafter.

Spiral coiled spring 4, formed of 4 to 10 turns, has its end at the centre secured to an arm of collet 23 at a point 5. This connection is achieved in a known manner, by laser welding or gluing. The outer end of spiral coiled spring 4 is secured at a point 9, visible in particular in FIG. 2, of the inner wall of drum 27. In the example shown, this connection is effected by welding the end of the spring in the substantially median portion of a metal plate 19 which is engaged in the grooves 18 of a recess provided in drum 27.

Figure 3A:
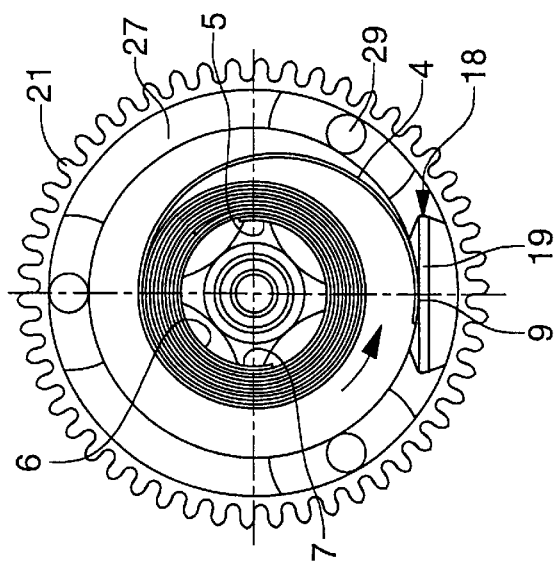
FIGS. 3A, 3B, 3C are top views of the shockproof device in three positions.
Figure 3B:
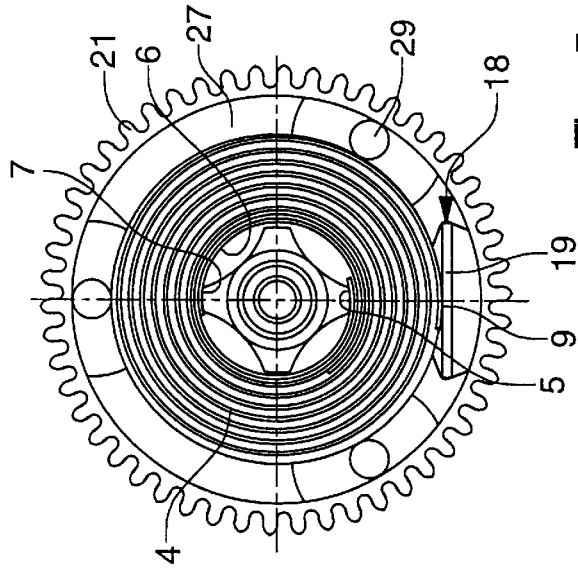

The spiral coiled spring is formed by a strip the cross-section of which and the material which forms it are such that, in normal operation, starting from the neutral position, shown in FIGS. 2 and 3B, in which the turns are regularly spaced, the turns begin to wind or unwind, then drive barrel 2 to transmit the movement to generator 1. In the event that this device is mounted in a wristwatch movement the torque must be comprised substantially between 5 $\mu$N.m.rad$^{-1}$ and 500 $\mu$N.m.rad$^{-1}$. By way of example, a steel spring with a cross section of 0.04×0.5 mm may be used.

Referring more particularly to FIGS. 1 and 3A, an extreme position is shown in the event of a shock in which the turns of spiral coiled spring 4 are pressed against the wall of drum 27 when arbour 24 is driven in the clockwise direction (indicated by an arrow in FIG. 3A). In the absence of any protection, and in the event that the oscillating weight still exerts force on arbour 24, the point of attachment 5 onto collet 23 may be torn away, or the first turn may buckle, as shown by arrow 17 in FIG. 4.

In order to avoid these drawbacks, a sliding strip 6 is added which envelops or surrounds spiral coiled spring 4 over a length substantially equal to the first turn of spring 4 in an open position (FIG. 3A), but without having any mechanical connection with the latter.

This sliding strip 6 may have the same elastic characteristics as spiral coiled spring 4, or superior characteristics by acting either on its section, or on the material which forms it.

Figure 3C:
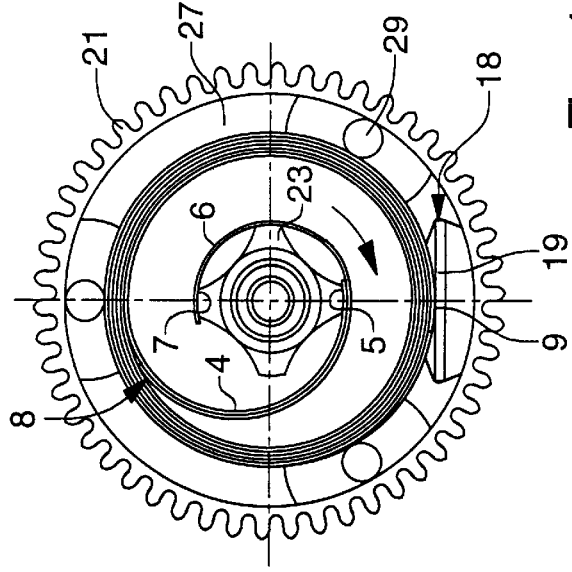
Figure 4:
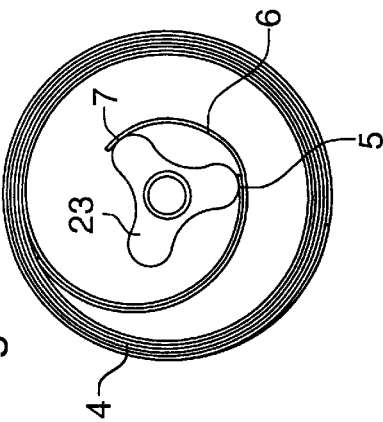
FIG. 4 is a diagram of a deformation which could be observed in the absence of the shockproof device according to the invention.
Figure 5:
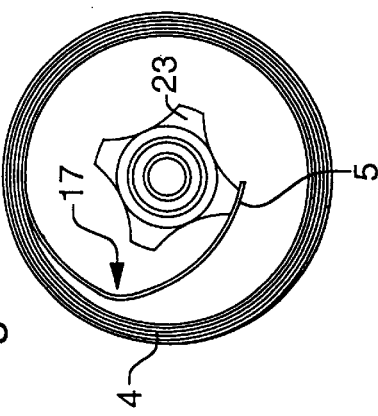
FIG. 5 is a variant of the connecting means at the centre of the shockproof device according to the invention.

Strip 6 has one of its ends anchored onto another arm of collet 23 at a point 7, located upstream of anchoring point 5 of spiral coiled spring 4. In the example shown, the two anchoring points have an angular offset of 180°, but is clear that any other offset is possible, without departing from the scope of the invention. By way of example, another type of collet with three arms, which gives an angular offset of 120°, is shown in FIG. 5. The other end of strip 6 is free and, in the open position, is pinched at a point 8 between the first and second turns of spiral coiled spring 4. This point 8 constitutes a provisional support point which reinforces the first turn, i.e. avoids the buckling mentioned previously in the event of excessive activation of oscillating weight 3. When the device again passes into the neutral position (FIG. 3B) strip 6 slides between the turns of spiral coiled spring 4 to occupy a position in which it will not exert any function on the normal operation of the oscillating weight. With reference now to FIG. 3C, it can be seen that, if the shock generates winding of the spiral coiled spring in the anti-clockwise direction, the turns regroup at the centre in the closed position and sliding strip 6 has no function, the solidity of the mechanism depending only on the anchoring at point 9 by plate 19 connected to drum 27.

It will also be observed that passage from the open position (FIG. 3A), or from the closed position (FIG. 3C) to the neutral position (FIG. 3B) constitutes a small energy reserve favourable to the global energy efficiency of the whole of the device.

The device which has just been described, with an intermediate wheel and pinion, has the advantages of reducing the height of the whole of the device and increasing, via the set of gears able to have a multiplying factor of the order of 50, the rotational speed of the rotor and consequently of having a favourable effect on the global energy balance.

If requirements from the point of view of energy are smaller, barrel 2 and oscillating weight 3 may form a single mechanical unit. In such case unbalanced mass 31 then rotates freely with respect to toothed ring 32, axle 34 of oscillating weight 3 is merged with arbour 24 of barrel 2 which then no longer includes pinion 25 and drum 27 is secured to toothed ring 32 which assures the same functions as toothed wheel 21 which can then be omitted. In other words, toothed ring 32 and toothed wheel 21 are then merged.

It is also possible for those skilled in the art to make modifications without departing from the scope of the invention to adapt the shockproof device to any type of wristwatch, or to other non-horological products, such as a portable telephone to increase its operating autonomy.

What is claimed is:

1. A shockproof device for a generator activated by the alternating movements of an oscillating weight transmitted to the generator via a barrel, said generator including a rotor provided with a pinion, said oscillating weight including an unbalanced mass secured to an axle and supported by a toothed wheel, and said barrel including a drum, having a base forming an external toothed wheel, which rotates freely about a pivoted arbor and inside which is wound a spiral coiled spring coupled at one end to the axle of the oscillating weight and secured at the other end to the inner wall of the drum to form driving means for the rotor, said spiral coiled spring having an elastic constant, such that, during normal operation, the turns of the spring are wound or unwound from a neutral position in which they are regularly spaced and occupy, in the event of a shock, an open position in which the turns are pressed against the inside of the drum or a closed position in which the turns are regrouped at the center, wherein an internal sliding strip is coupled to the arbor driven by the oscillating weight, said sliding strip being wound in the same manner as the spiral coiled spring and surrounding the latter without any rigid mechanical connection over a length substantially corresponding to a turn of the spring in the open position.

2. A shockproof device for a generator according to claim 1, wherein the unbalanced mass of the oscillating weight, is fitted on the barrel and rotates freely with respect to the arbor to drive the toothed ring which meshes directly with the pinion of the rotor.

3. A shockproof device for a generator according to claim 1, wherein the barrel forms an independent intermediate wheel and pinion whose toothed wheel meshes with the pinion of the rotor and whose arbor is extended by a pinion to mesh with the toothed ring which is secured to the unbalanced mass of the oscillating weight.

4. A shockproof device for a generator according to claim 1, wherein fastening of the spiral coiled spring and the sliding strip to the center is effected via a collet driven onto the arbor of the barrel allowing the respective points of attachment to be separated by an angle comprised between 30° and 180°.

5. A shockproof device for a generator according to claim 2, wherein the barrel is closed by a cover held by pins secured to the drum.

6. A wristwatch including a shockproof device for a generator according to claim 1, for powering an electronic movement or an electronic unit associated with means for receiving and transmitting electromagnetic signals.

7. A shockproof device for a generator according to claim 6, wherein the neutral position is obtained by selecting a spiral spring having an elastic constant comprised between 5 $\mu$N.m.rad$^{-1}$ and 500 $\mu$N.m.rad$^{-1}$.

* * * * *